April 20, 1965  S. M. BAGNO  3,179,871
BATTERY CHARGING CIRCUIT
Filed Feb. 1, 1961
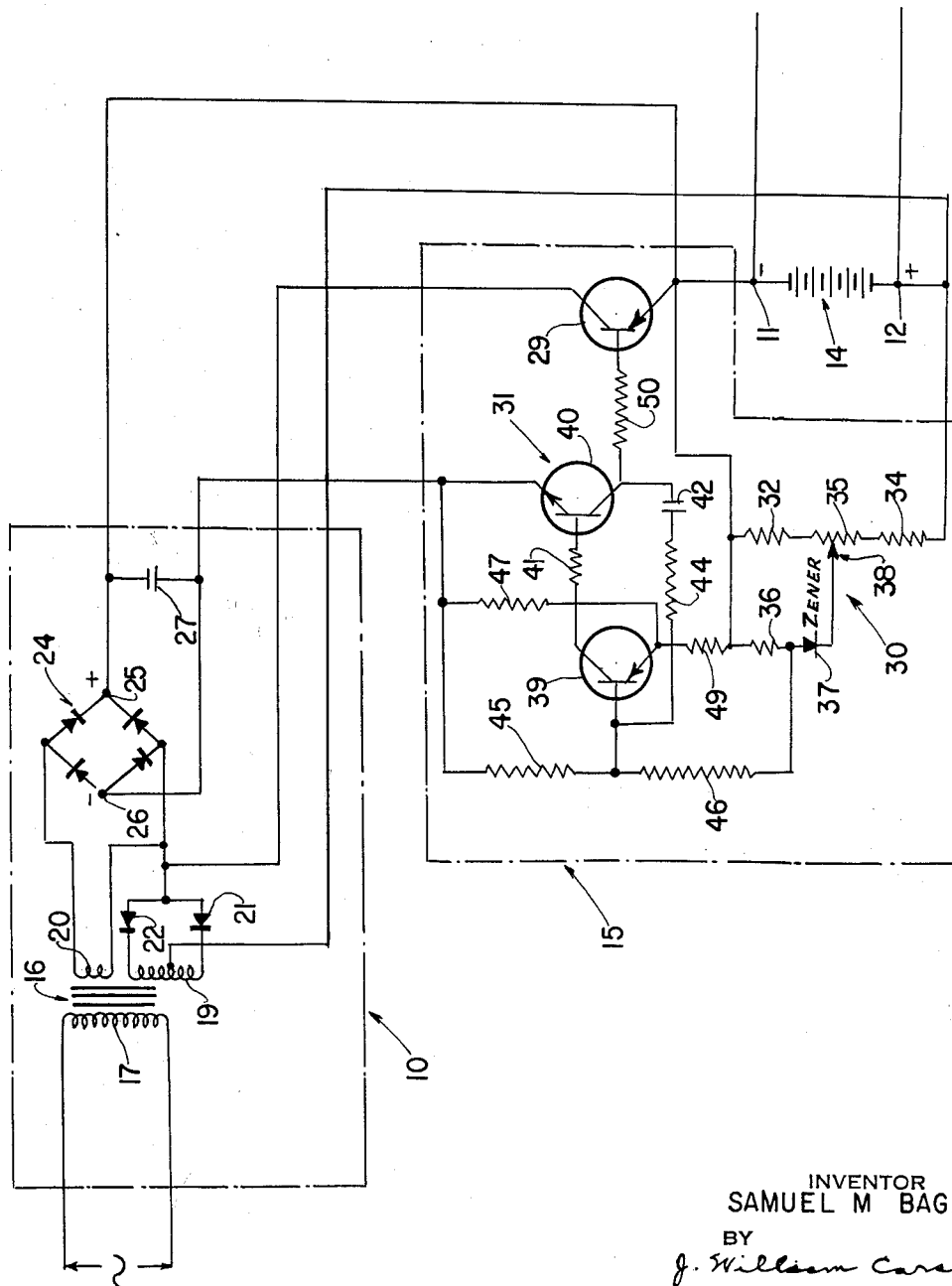
INVENTOR
SAMUEL M BAGNO
BY
J. William Carson
ATTORNEY

3,179,871
BATTERY CHARGING CIRCUIT
Samuel M. Bagno, Belleville, N.J., assignor to Specialties Development Corporation, Belleville, N.J., a corporation of New Jersey
Filed Feb. 1, 1961, Ser. No. 86,512
5 Claims. (Cl. 320—30)

The present invention relates to battery charging circuits, and, more particularly, to such circuits which are regulated in accordance with the charge in the battery.

In charging a storage battery care must be taken that the battery is not damaged by charging at too great a rate which induces heating and buckling of the electrode plates, or by overcharging which electrolizes the water in the electrolyte into hydrogen and oxygen, concentrating the electrolyte to a point where it will damage the plates. The rate at which a battery can safely be charged is dependent upon the internal resistance which is exhibited to the charging current. When the charge on the battery is low, the internal resistance is low and a substantial charging current may be passed through the battery without overheating. As the charge on the battery increases the internal resistance thereof also increases and the permissible charging current decreases.

Accordingly, an object of the present invention is to provide a battery charging circuit wherein the charging of the battery is controlled by the charge in the battery.

Another object is to provide such a circuit wherein the rate at which the battery is charged is continuously varied in accordance with the charge in the battery.

Another object is to provide such a circuit which automatically turns off when the battery is fully charged.

A further object is to provide such a circuit which automatically controls the complete charging cycle of the battery.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing a battery charging network comprising a source of unidirectional charging current, switch means for completing a charging circuit between the source and the battery, and switch operating means responsive to the charge in the battery for operating the switch means to complete the charging circuit.

A preferred embodiment of the invention has been chosen for purposes of illustration and description, and is shown in the accompanying drawing, forming a part of the specification, wherein:

The single figure of the drawing is a circuit diagram of the battery charging circuit in accordance with the present invention.

Referring to the drawing in detail there is shown a battery charging circuit in accordance with the present invention which generally comprises a source of direct current power 10, a pair of output terminals 11, 12 for the connection of a battery 14 to be charged, and an electronic switching circuit 15 connected between the source 10 and the output terminals 11, 12 to regulate the charging rate in accordance with the charge in the battery 14.

The source of direct current power 10 includes a transformer 16 having a primary winding 17 for connection to a conventional 115 volt alternating current supply and secondary windings 19 and 20. The secondary winding 19 is center tapped and has each end thereof connected to the negative pole of one of a pair of diodes 21, 22. The positive poles of the diodes are connected together and to the terminals 11 through the switching circuit 15, and the center tap of the winding 19 is connected to the terminal 12. To provide power for the switching circuit 15, the secondary winding 20 is connected to a full wave rectifying diode bridge 24 having a positive output terminal 25 and a negative output terminal 26. A filter capacitor 27 is connected between the terminals 25 and 26 to smooth the output of the bridge.

The switching circuit 15 includes a PNP type power transistor 29 for switching on and off the flow of charging current to the battery 14, a voltage sensitive network 30 connected between the terminals 11 and 12 for sensing the charge in the battery, and a switch controlling multivibrator circuit 31 of the phantastron type responsive to the network 30 for controlling the conductive state of the transistor 29.

The transistor 29 has its collector connected to the positive poles of the diodes 21 and 22 and its emitter connected to the terminal 11 to complete the current path for charging the battery 14.

The voltage sensitive network 30 includes a 32 ohm resistor 32 and a 25 ohm resistor 34 connected in series with a 30 ohm adjustably tapped resistor 35 between the terminals 11 and 12, and a 220 ohm resistor 36 connected in series with a zener diode 37 between the terminal 11 and the adjustable tap 38 of the resistor 35.

The switch controlling multivibrator circuit 31 includes a PNP type transistor 39 and a NPN type transistor 40. The collector of the transistor 39 is connected to the base of the transistor 40 through a 100 ohm resistor 41 and the collector of the transistor 40 is connected to the base of the transistor 39 through a feedback circuit comprising a 1 micro farad capacitor 42 and a 2,200 ohm resistor 44. The base of the transistor 39 is also connected to the junction of a 10,000 ohm resistor 45 and a 1,000 ohm resistor 46 which are connected in series between the diode bridge output terminal 26 and the junction of the resistor 36 and the diode 37. The emitter of the transistor 39 is connected to the junction of a 3,300 ohm resistor 47 and a 200 ohm balco resistor 49 which are connected in series between the terminal 26 and the terminal 11.

The transistor 40 has its emitter connected to the terminal 26 and its collector connected through a 100 ohm resistor 50 to the base of the transistor 29.

In operation, when the battery 14 is discharged, the voltage drop between the terminal 11 and the tap 38 is less than the 12 volts required to cause the diode 37 to conduct. Since the ratio of the resistor 49 to the resistor 47 is less than the ratio of the resistor 46 to the resistor 45, the base of the transistor 39 is biased to be more negative than the emitter thereof and the transistor conducts. The collector current of the transistor 39 flows through the base-emitter circuit of the transistor 40 which is thereby placed in conduction and current flows from the terminal 25 through the emitter-base circuit of the transistor 29, the resistor 50, and the collector-emitter circuit of the transistor 40 to the terminal 26. When the transistors 40 and 29 are conducting the capacitor 42 charges to the potential difference between the base of the transistor 39 and the collector of the transistor 40. Since the transistor 40 is conducting heavily, the collector thereof is near the potential of the negative terminal 26 while the base of the transistor 39 is nearer the potential of the positive terminal 25.

A battery charging current then flows from the center tap of the winding 19 through the battery 14 and the emitter-collector circuit of the transistor 29 to the positive poles of the diodes 21 and 22.

When the charge on the battery 14 is sufficient to increase the potential between the terminal 11 and the tap 38 to 12 volts, the diode 37 begins to conduct. The voltage drop across the diode 37 can never exceed 12 volts, therefore, any increase in the potential between the terminal 11 and the tap 38 in excess of 12 volts is impressed across the resistor 36 thereby decreasing the negative bias on the base of the transistor 39.

After the battery has been charged to a value above that required to break down the diode 37, any further increase in the charge in the battery causes a change in the bias on the base of the transistor 39 such that the level of conduction of the transistors 39 and 40 decrease.

Due to the amplification of the transistors 39 and 40, when the levels of conduction of these transistors decrease, the collector of the transistor 40 becomes positive at a greater rate than does the base of the transistor 39, therefore, the potential applied across the capacitor 42 reverses polarity and the capacitor 42 discharges through the resistors 44 and 46 driving the base of the transistor 39 still more positive. The transistors 39 and 40 are thereby cut off and the transistor 29 is switched off interrupting the battery charging current.

The transistors 39, 40 and 29 remain cut-off until the discharge current of the capacitor 42 decreases to a value which allows the base of the transistor 39 to again become negative with respect to the emitter thereof. The length of time the transistors are cut off is dependent upon he value of the bias voltage applied to the base of the transistor 39 as a result of the voltage drops across the resistors 45, 46, and 36. As this bias potential approaches the cut-off value, the value of the discharge current which will hold the transistor 39 cut off decreases and therefore the capacitor 42 must discharge over a longer period of time before the base of the transistor 39 becomes negative with respect to the emitter thereof.

As the base of the transistor 39 becomes negative with respect to the emitter thereof, the transistors 39 and 40 go into conduction. The capacitor 42 then recharges, drawing current through the base-emitter circuit of the transistor 39. The charging current increases the conduction of transistors 39 and 40 placing them in saturation and turning on the transistor 29 to re-establish the battery charging current.

As the capacitor 42 re-charges, the charging current decreases and the transistors 39 and 40 move from the saturated state toward the less conductive state dictated by the bias potential applied to the base of the transistor 39. When the charge on the capacitor 42 approaches the potential difference between the base of transistor 39 and the collector of transistor 40, the transistor 39 goes under the control of the bias potential and the cycle is repeated in response to the increasing charge in the battery.

Since it is the current charging the capacitor 42 which holds the transistor 39 in a more highly conductive state than that dictated by the bias potential, the charge on the capacitor 42 approaches the potential difference between the base of transistor 39 and the collector of transistor 40, as the conductive state of the transistors approaches that dictated by the bias potential.

The length of time that the transistor 29 remains turned on is therefore dependent on the bias of the base of the transistor 29. The closer this bias is to the potential at the emitter of the transistor 39, the smaller the potential difference between the base of the transistor 39 and the collector of transistor 40 and the shorter the time required to charge the capacitor 42 to this potential.

It can be seen, therefore, that when the battery voltage is low, the transistor 29 is turned on for long periods of time which are interrupted by short periods during which the transistor 29 is turned off, and as the battery voltage increases the "on" period decreases while the "off" increases.

When the battery is fully charged, the bias potential impressed upon the base of the transistor 39 is of a value which maintains the transistors 39, 40, and 29 cut off.

This system may be utilized in the manner of a conventional battery charger to charge batteries which are periodically connected thereto when the charging is required.

This system also may be permanently connected to a battery to provide an automatically rechargeable battery power source which could be used as a standby source in connection with equipment normally powered through a rectifier from an alternating current source. In such a standby power source, the battery is connected to the load when the alternating current power fails. The battery then provides the power until the alternating current power is restored, at which time the charger would go into operation and automatically recharge the battery.

From the foregoing description it will be seen that the present invention provides an improved battery charging network which is automatically and continuously controlled by the charge in the battery to vary the charging rate and cut off the charging current completely when the battery is charged.

As various changes may be made in the form, construction and arrangement of the parts herein, without departfrom the spirit and scope of the invention and without sacrificing any of its advantages, it is to be understood that all matter herein is to be interpreted as illustrative and not in any limiting sense.

I claim:

1. A battery charging network comprising a source of unidirectional charging current, switch means having an open and a closed condition for opening and closing a current path between said source and the battery to be charged, means adapted to be connected to said battery for producing a voltage related to the voltage of said battery, means for comparing said voltage to a voltage reference and producing a control voltage equal to the difference therebetween, and means responsive to said control voltage for operating said electronic switch to alternately place said switch in the open condition for a period which increases with increases of said control voltage and in the closed condition for a period which decreases with increases in said control voltage.

2. A battery charging network comprising a source of unidirectional charging current, switch means having an open and a closed condition for controlling the flow of charging current from said source to the battery to be charged, resistance means adapted to be connected across said battery for producing a voltage related to the voltage of said battery, means connected to said resistance means for providing a control voltage having a value equal to that by which the voltage produced by said resistance means exceeds a predetermined value, and means responsive to said control voltage for operating said switch to alternately place said switch in one condition for a period which increases with increases in said control voltage and in the other condition for a period which decreases with increases in said control voltage.

3. A battery charging network comprising a source of unidirectional charging current, electronic switch means for completing a charging circuit between said source and the battery to be charged, resistance means adapted to be connected across said battery for producing a voltage of said battery, means connected to said resistance means for producing a control voltage having a value equal to that by which the voltage produced by said resistance means exceeds a predetermined value, means responsive to said control voltage for operating said electronic switch to alternately close said switch for a period which varies inversely with variations in said control voltage and open said switch for a period which varies directly with variations in said control voltage.

4. A network according to claim 3 wherein said resistance means includes a voltage dividing circuit connected across said battery and said control voltage producing means includes a zener diode and a resistance connected in series across the output of said voltage dividing circuit, said control voltage being developed across said resistance.

5. A network according to claim 3 wherein said electronic switch operating means includes a multivibrator circuit.

References Cited by the Examiner
UNITED STATES PATENTS

| | | | |
|---|---|---|---|
| 2,850,695 | 9/58 | Bishop | 323—22 |
| 2,991,410 | 7/61 | Seike | 321—2 X |
| 2,994,029 | 7/61 | Bixby | 323—22 |

LLOYD McCOLLUM, *Primary Examiner.*

ORIS L. RADER, *Examiner.*